United States Patent [19]
Bolt et al.

[11] 4,325,250
[45] Apr. 20, 1982

[54] CIGARETTE TESTING DEVICE

[75] Inventors: Reginald C. Bolt; John G. Dowding; Robert E. Williams, all of London, England

[73] Assignee: Molins Limited, London, England

[21] Appl. No.: 145,231

[22] Filed: Apr. 30, 1980

[30] Foreign Application Priority Data

May 2, 1979 [GB] United Kingdom ............ 15325/79

[51] Int. Cl.³ ............................................. G01N 15/08
[52] U.S. Cl. ............................................ 73/38; 73/41; 73/45.1
[58] Field of Search ............... 73/38, 49.1, 49.5, 45, 73/45.1, 45.2, 40, 37, 41

[56] References Cited

U.S. PATENT DOCUMENTS

| | | | |
|---|---|---|---|
| 3,991,605 | 11/1976 | Reuland | 73/38 |
| 4,018,081 | 4/1977 | Loxham | 73/41 |
| 4,127,025 | 11/1978 | Mills et al. | 73/38 |
| 4,154,090 | 5/1979 | Heitmann et al. | 73/45.1 |

*Primary Examiner*—Donald O. Woodiel
*Attorney, Agent, or Firm*—Craig and Antonelli

[57] ABSTRACT

A device for testing filter cigarettes, comprises a drum or equivalent means for conveying cigarettes in succession through a test station at which each cigarette in turn is tested with the aid of a pressure chamber surrounding the wrapper of the cigarette, and a pressure detector connected to the filter end of the cigarette while the tobacco end of the cigarette is open to atmosphere, and including means for measuring the pressure in the pressure chamber and means for comparing that pressure with the pressure detected at the filter end of the cigarette. Preferably there is a second test station at which the pressure chamber extends over the tobacco end of the cigarette, and a second pressure detector is connected to the filter end of the cigarette.

23 Claims, 9 Drawing Figures

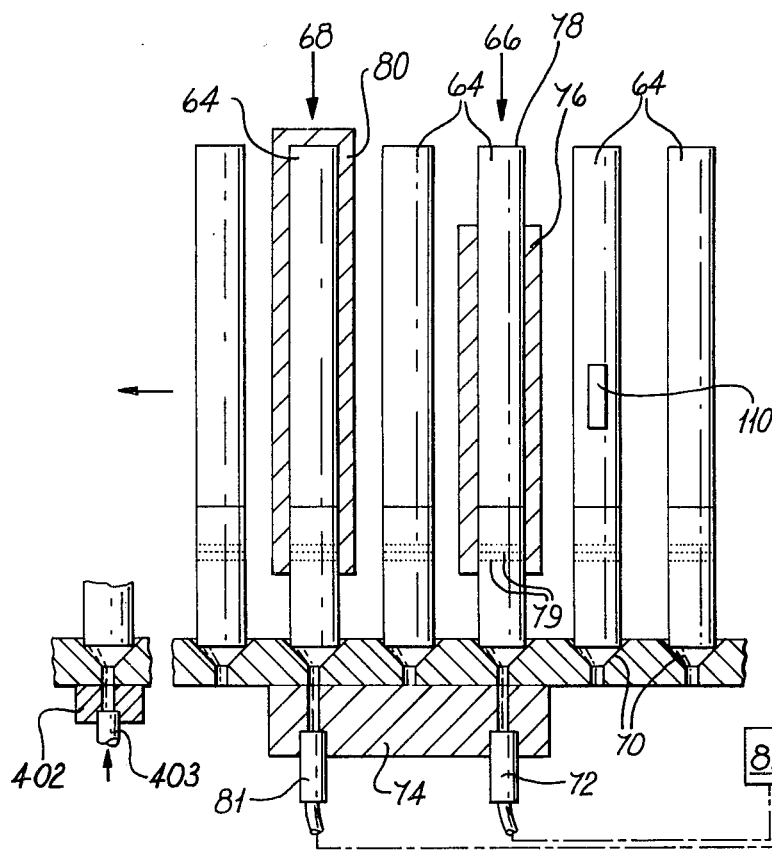
FIG. 6
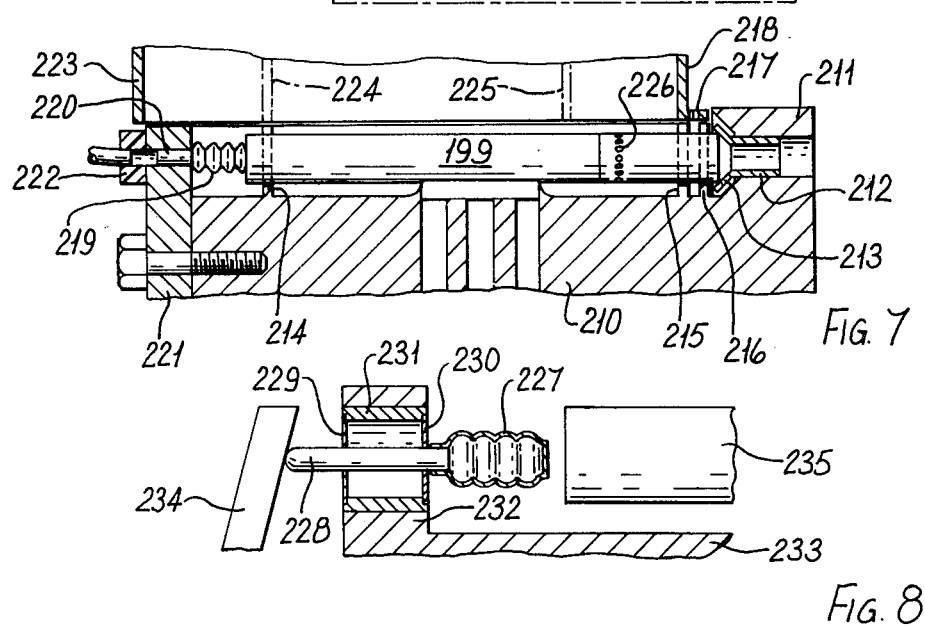
FIG. 7
FIG. 8

CIGARETTE TESTING DEVICE

This invention is concerned especially with testing ventilated cigarettes, which are cigarettes having deliberately air-permeable wrappers through which atmospheric air enters during smoking to dilute the smoke. Such cigarettes are commonly formed with filters. This invention will therefore, for convenience, be described in terms of filter cigarettes, though testing devices according to this invention can also be used on non-filter cigarettes.

In the case of a ventilated cigarette, it is desirable to be able to test the degree of ventilation. Inadequately ventilated cigarettes may require to be ejected; alternatively, if the testing device indicates that the degree of ventilation is inadequate, that may be indicative of a fault in the cigarette manufacturing process or in one of the materials (e.g., the filter tipping material) used to make the cigarettes. When inadequate ventilation is indicated by the testing device, the entire cigarette making process may be stopped to remedy the defect.

It is also desirable to detect and normally to eject cigarettes having an excessively leaky wrapper which may be indicative, for example, of a tear in the cigarette paper or of a defective joint between the filter and the tobacco portion of the cigarette. The present invention is concerned with a testing device for detecting such faults and also inadequate ventilation.

According to this invention, a device for testing filter cigarettes comprises a drum or equivalent means for conveying cigarettes in succession through a test station at which each cigarette in turn is tested with the aid of a pressure chamber surrounding the wrapper of the cigarette, and a pressure detector connected to the filter end of the cigarette while the tobacco end of the cigarette is open to atmosphere, and including means for measuring the pressure in the pressure chamber and for comparing that pressure with the pressure detected at the filter end of the cigarette.

The pressure chamber may have pressure at either below or above atmospheric pressure. The term "pressure" in this context should be interpreted accordingly.

The ratio which the pressure at the filter end bears to the pressure in the chamber represents the cigarette dilution; that is, it is an indication of the amount of air which will be drawn through the wrapper as a percentage of the total gas drawn by the smoker through the filter. It is assumed that there is no air flow through the pressure detector; that is possible using a semiconductor pressure detecting device which is preferred. Expressed another way, the dilution represents the ratio which the cigarette wrapper resistance (to air flow) bears to the tobacco resistance plus the filter resistance.

It is possible in principle to measure the pressure in the pressure chamber at the same time as measuring the pressure at the filter end of the cigarette; that is to say, at a single test station. However, a preferred arrangement according to this invention is as follows. There is a second test station at which the pressure chamber (conveniently part of the pressure chamber used at the first test station) is arranged to extend over the tobacco end of the cigarette, and at which an indication of the chamber pressure is given by a pressure detector connected to the filter end of the cigarette; preferably a separate pressure detector is used for this purpose. This arrangement has the advantage of compensating for any possible leakage to atmosphere in the connection between the pressure detectors and the filter end of the cigarette, assuming that the connection is made by the same seal during both tests.

In a preferred arrangement, the pressure detector (or each if there are two) is preferably connected to the filter end of the cigarette via a flexible seal which resiliently engages the cigarette. The seal may have a conical end portion in which the cigarette is arranged to engage, being preferably pushed against the conical portion by a pusher member engaging the tobacco end of the cigarette (though without closing the tobacco end since this should be open to atmosphere during the first test, and to the chamber pressure during the second test).

A testing device according to this invention is readily adaptable for testing cigarettes which are delivered in two rows from a filter attachment machine. The drum in that case may have a central flange carrying seals on opposite sides for engaging with the filters of the cigarettes of the respective rows. Pressure signals from the cigarettes of the two rows can then be detected by a common detector which is arranged to communicate alternately with cigarettes from the two rows. At the opposite ends of the drum, all that are needed are the pusher members to push the cigarettes towards the central flange before they reach the test station or stations. After the cigarettes have been tested, it is desirable to move them slightly away from the flange so that they can be transferred from the drum without damage to the seals or to the cigarettes themselves; this can be simply achieved by supplying compressed air briefly to the seals to blow the cigarettes away.

Other preferred features and other aspects of this invention are defined by the accompanying claims. Examples of testing devices according to this invention are shown in the accompanying drawings, in which:

FIG. 6 is a diagrammatic drawning illustrating the operation of a testing device according to this invention;

FIG. 7 is a sectional view of part of a different testing device;

FIG. 8 is an illustration of a possible modification of the pusher arrangement shown in FIG. 7.

Figure 1:
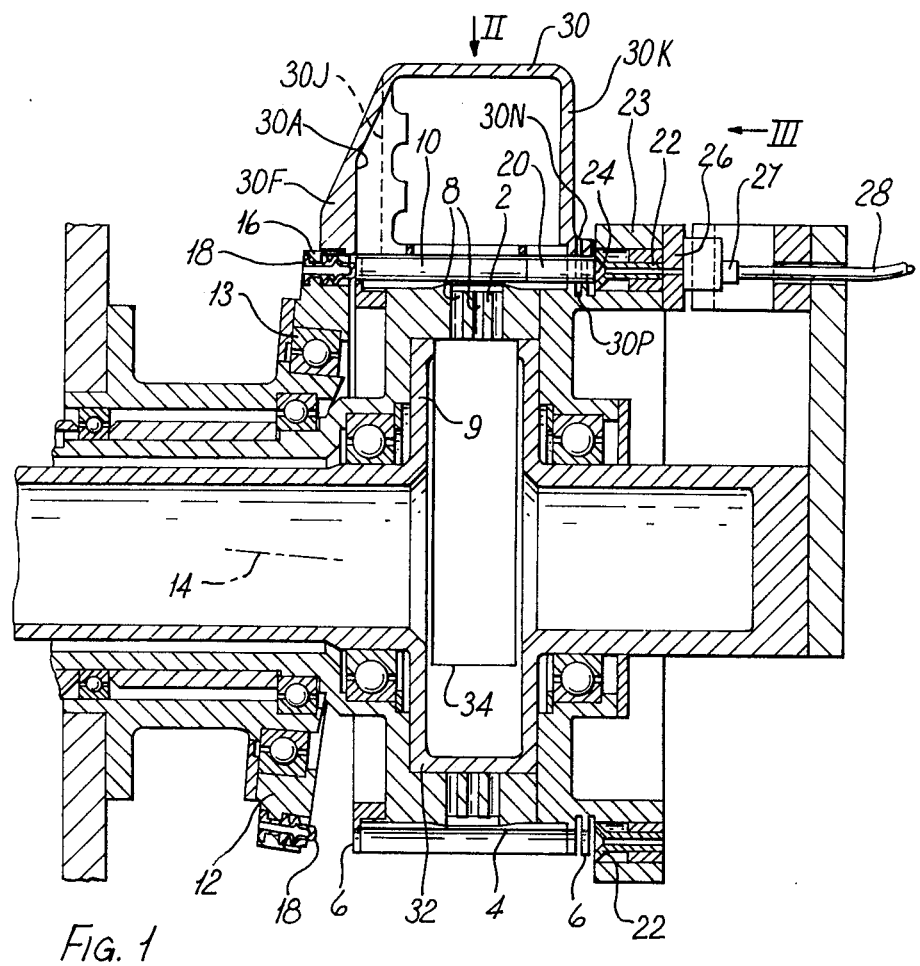
FIG. 1 is a sectional view of one device for testing a single row of cigarettes.

The device shown in FIG. 1 comprises a drum 2 which has a number of circumferentially spaced trough-like flutes 4. Support members 6 at each end of each trough are arranged to hold the cigarettes just clear of the bottom of the trough, except in the region of suction ports 8 where the surface of the trough is raised so as to contact the cigarettes. Suction is applied to the ports 8 via a fixed member 9 around which the drum rotates.

A cigarette 10 is shown at the second of two test stations (as described below).

A rotatable ring-like member 12 is mounted by a bearing 13 for rotation about an inclined axis 14 and rotates with the drum 2 so that as the drum rotates to bring each cigarette to the test stations, an adjacent portion 16 of the ring 12 moves towards the tobacco end of the cigarette. This portion 16 carries a flexible pusher member 18 which engages the tobacco end of the cigarette and moves it slightly in its trough until the end of the filter 20 of the cigarette is pressed against the conical end of a flexible seal 22 mounted in a flange 23 at the adjacent end of the drum. This seal is made of a very flexible elastomeric material and its conical end portion is so shaped as to engage all the way around the edge 24 of the filter to form a close seal without damaging the cigarette. A miniature semiconductor pressure transducer 27 (e.g., one of the ENDEVCO 8510 series) is mounted on a stationary valve pad 26 which is held in engagement with the end surface of drum, and has passages arranged to communicate with each seal in turn. A pressure signal from the transducer is transmitted to a processing circuit via a cable 28. There is a similar transducer on the pad, which is located at the other test station and communicates similarly with each cigarette in turn.

When each cigarette is in the region of the test stations, it is covered by a suction cowl 30 (which is described below), so that suction (e.g., at about 25 mm water gauge) is applied around the cigarette wrapper.

The pusher 18 which engages the tobacco end of the cigarette is formed so that it contacts only the central part of the end and therefore does not touch the end of the cigarette wrapper and more particularly does not seal off the end of the cigarette; thus when suction is applied to the cigarette via the cowl 30, the transducer 27 experiences a pressure which is in fact dependent upon the relationship between the amount of air passing through the wrapper and the amount passing through the filter end of the cigarette. Since the dilution of the cigarette, in use, is directly related to the ratio of the amount of air drawn into the perforations, to the total gas flow through the filter, it will be appreciated that this measurement gives a reading of dilution, assuming cowl suction is constant.

The fixed member 9 upon which the drum rotates, and which has its interior evacuated by means of a suction pump (not shown), is arranged to supply suction to the ports 8 at the required positions via a suitably-shaped port 34. Suction applied through the ports 34 and 8 acts to draw the cigarettes onto the drum 2 from a transfer roller (not shown) and then to hold the cigarettes on the drum until they are required by a take-off roller (not shown).

It should be noted that each seal 22 is contained within a recess in the flange 23 so as not to project from the base of the flange. This reduces the possibility of accidental damage to the seals.

Figure 2:
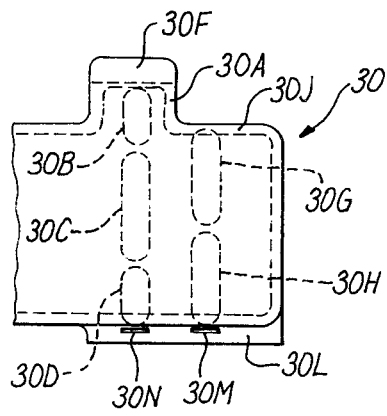
FIG. 2 is a view, in the direction of the arrow II in FIG. 1, of a cowl forming part of the testing device.
Figure 3:
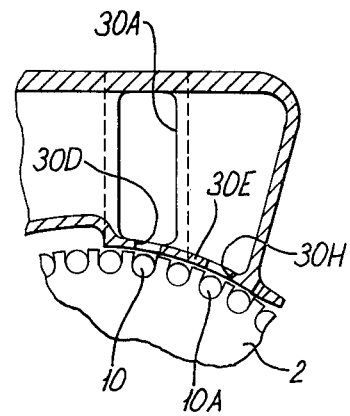
FIG. 3 is a view of the cowl in the direction of the arrow III in FIG. 1.

FIGS. 2 and 3 show more details of the cowl 30 shown in FIG. 1. FIG. 3 shows the cigarette 10 at the second testing station and also shows other cigarettes on the drum 2, including a cigarette 10A which is at the first testing station. The function of these two testing stations will be explained with reference to FIG. 6.

As shown in FIGS. 1 to 3, the cowl has an enlargement 30A in the region of the second test station, so as to apply suction along the entire length of the cigarette via three slots 30B, 30C and 30D in a curved wall 30E adjacent to the periphery of the drum. Also, at the second test station, the cowl has a wall portion 30F which extends over the top of the inclined ring 12 and is a close fit around the ring so as to form a rudimentary seal. Thus, at the second test station, suction from the cowl is applied along substantially the entire length of the cigarette and also over the tobacco end. There is only running clearance between the ring 12 and the adjacent end face of the drum (at the test stations) to prevent excessive leakage of suction; this clearance is shown exaggerated in FIG. 1 for the purpose of illustration.

At the first test station, the cowl is narrower so as to apply suction, through slots 30G and 30H, only along part of the length of the cigarette terminated by a wall 30J of the cowl. Thus, at the first test station, the tobacco end of the cigarette is open to atmosphere.

A wall 30K of the cowl carries at its lower end a flange 30L which is formed with slots 30M and 30N through which, at the test stations, an annular chamber 30P around the filters of the cigarettes communicates with the atmosphere. This "air guard ring" ensures that the suction pressure within the cowl is completely isolated from the transducer 27 even if there is a slight inadvertent leak in the sealing engagement of the seal 22 with the end of the cigarette.

Suction is transmitted to the operative part of the cowl through the left-hand end of the cowl (FIGS. 2 and 3), at which the cowl is mounted on a suitable fixed structure (not shown).

The inclined ring 12 may be driven in any convenient way so that each of the pushers 18 engages the end of the cigarette as it approaches the testing stations. For example, the ring may have projections which engage in the adjacent ends of the flutes in the drum; such projections may also cooperate in sealing the end of the flute in the region of the second test station.

Figure 4:
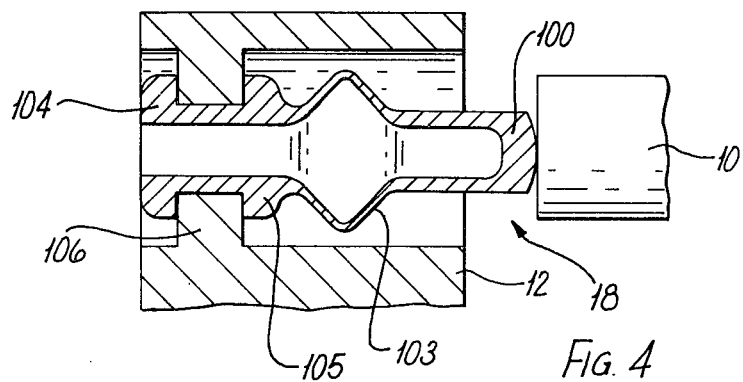
FIG. 4 is an enlargement of part of FIG. 1 showing one of the pusher members.

The construction of each of the pushers 18 is shown more clearly in FIG. 4. It is of tubular construction, having a closed end 100 to engage the end of a cigarette 10, a bellows portion 103 and a mounting portion comprising flanges 104 and 105 engaging opposite sides of an internal flange 106 in a bore in the ring 12 containing the pusher member. The pusher member is made of a highly flexible plastics material, so that its bellows portion 103 acts as a light compression spring. It should be noted that the closed end 100 is substantially smaller in diameter than the cigarette 10.

As shown in FIG. 7, the flutes in the drum have a depth which is slightly greater than the cigarette diameter. In other words, the parts of the drum lying between the flutes extend slightly beyond the cigarette to define the outer periphery of the drum which lies close to the adjacent curved wall 30E of the cowl.

Figure 5:
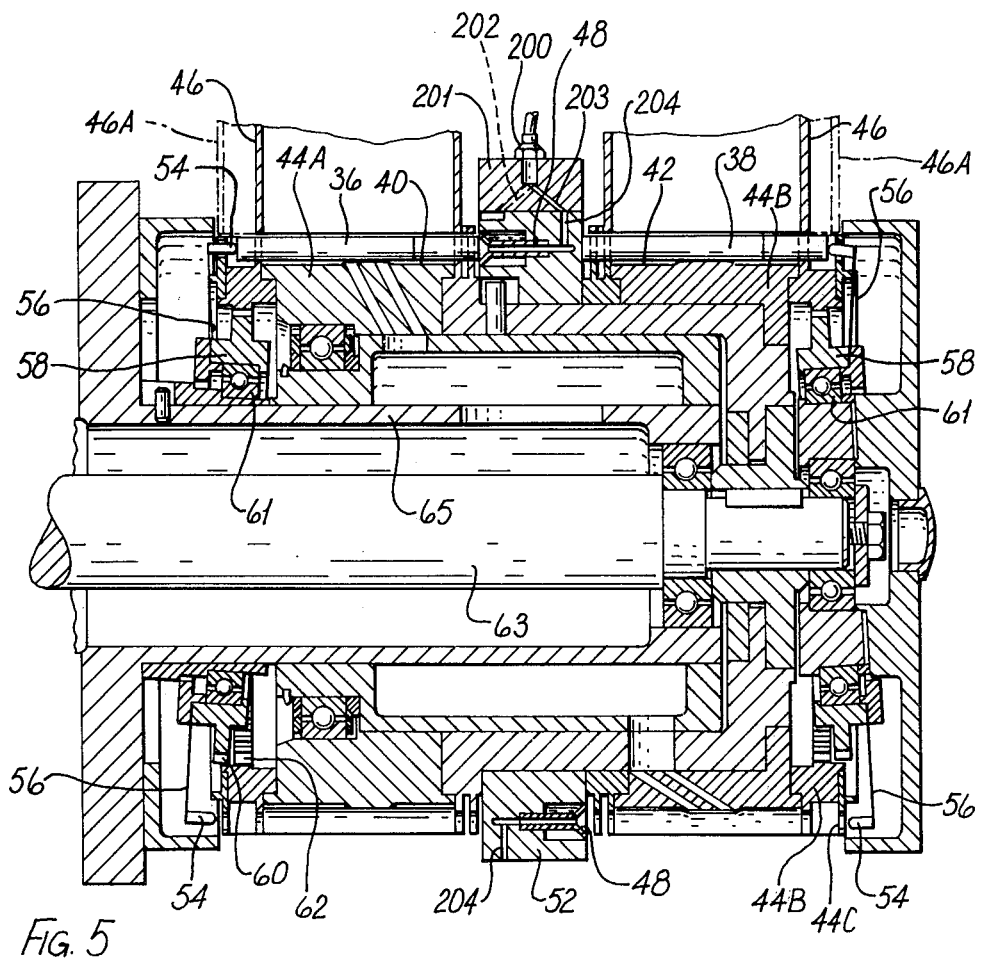
FIG. 5 is a sectional view of a different testing device for testing two rows of cigarettes.

FIG. 5 shows a testing system which is similar in principle to that of FIG. 1, but is capable of testing two rows of cigarettes at once. The cigarettes 36 and 38 of the respective rows are supported in flutes 40, 42 of a double-length conveyor drum comprising parts 44A and 44B which are joined together as shown. The flutes on the two halves of the drum are staggered by half a pitch to allow a seal 48 for each row to be incorporated in a central flange 52. The filter end of each cigarette is urged into engagement with its corresponding seal by means of a small pin or stud 54 which engages with the tobacco end before the cigarette reaches the test stations, and then disengages from it to allow the cigarettes to be transferred from the drum. This action is achieved by mounting each stud 54 on one end of a leaf spring 56 whose other end is mounted on a ring member 58. This ring member thus carries a number of such leaf springs 56 each of which is aligned with the end of one of the flutes. The ring member is rotated, at the same speed as the drum, by means of an external ring of gear teeth 60 which mesh with an internal ring of teeth 62 formed in an annular member fixed to the end of the drum. The ring member 58 is mounted on a bearing 61 to rotate about an axis which is inclined at a small angle to the axis of the drum, so that its ring of external gear teeth only engages the ring of internal teeth 62 in the region of the test stations. Thus each of the studs 54 is in alignment with the tobacco end of the corresponding cigarette as it approaches the test stations. Suction is applied through the drum in basically the same way as in the case of the embodiment of FIG. 1, and a suction cowl 46 (shown diagrammatically) lies over each half of the drum in the region of the test stations. The chain dotted line 46A shows the position of the variable wall of the cowl at the second test station. A ring 44B attached to the outer end of each drum half forms an extension to each flute and carries a further ring 44C having apertures through which the studs 54 pass with minimal clearance. To improve the suction seal (for the second test station), the studs may carry resilient sealing washers to engage the outer surface of the ring 44C as the studs pass through the apertures.

It should be noted that, for the purpose of illustration, the plane of the section shown in FIG. 5 is varied so as to show as much detail as possible.

The drum is driven by a shaft 63 which passes through a fixed sleeve 65 on which the drum is rotatably mounted, and is keyed to the right-hand end of the drum.

At each of the test stations, there is a transducer 200 which is mounted on a fixed pad 201 lying against the cylindrical periphery of the flange 52. The transducer communicates alternately with cigarettes in the two rows via oblique passages 202 and 203 in the pad 201 and radial passages 204 communicating with the respective seals 48. During moments of time when each transducer is not communicating with one of the seals, it may be vented to atmosphere through a suitable passage in the pad 201 in a well known manner.

FIG. 6 shows diagrammatically how two-station testing devices according to this invention operate. It shows a flat developed view of a conveyor drum having a number of flutes carrying cigarettes 64 through two testing stations 66 and 68, while the filter ends of the cigarettes are engaged with respective end seals 70 (shown diagrammatically).

The first testing station 66 has a transducer 72 mounted on a stationary valve pad 74 and communicating with the end seal of the cigarette in the test station. There is also a suction cowl (not shown) overlying the drum so as to form a suction chamber 76 in cooperation with the flute containing the cigarette. The suction chamber 76 surrounds substantially the whole length of the cigarette but leaves the tobacco end 78 open to atmosphere. The area of the filter covered by the cowl includes ventilation apertures 79 in the cigarettes.

The second test station 68 is similar in all respects to the first, except that the suction cowl forms a suction chamber 80 which extends over the tobacco end of the cigarette. A second transducer 81 on the valve pad communicates with the cigarette at the second test station 68. Both transducers are connected to a signal processing circuit 82.

The dilution level of the cigarette is then given by P1/P2 where P1 is the pressure measured at transducer 72 and P2 is the pressure measured at the transducer 81 for the same cigarette. This measurement of dilution is independent of any leakage at the filter end seal, and is also independent of the level of suction or pressure in the cowl (provided the latter is the same at both test stations).

Figure 9:
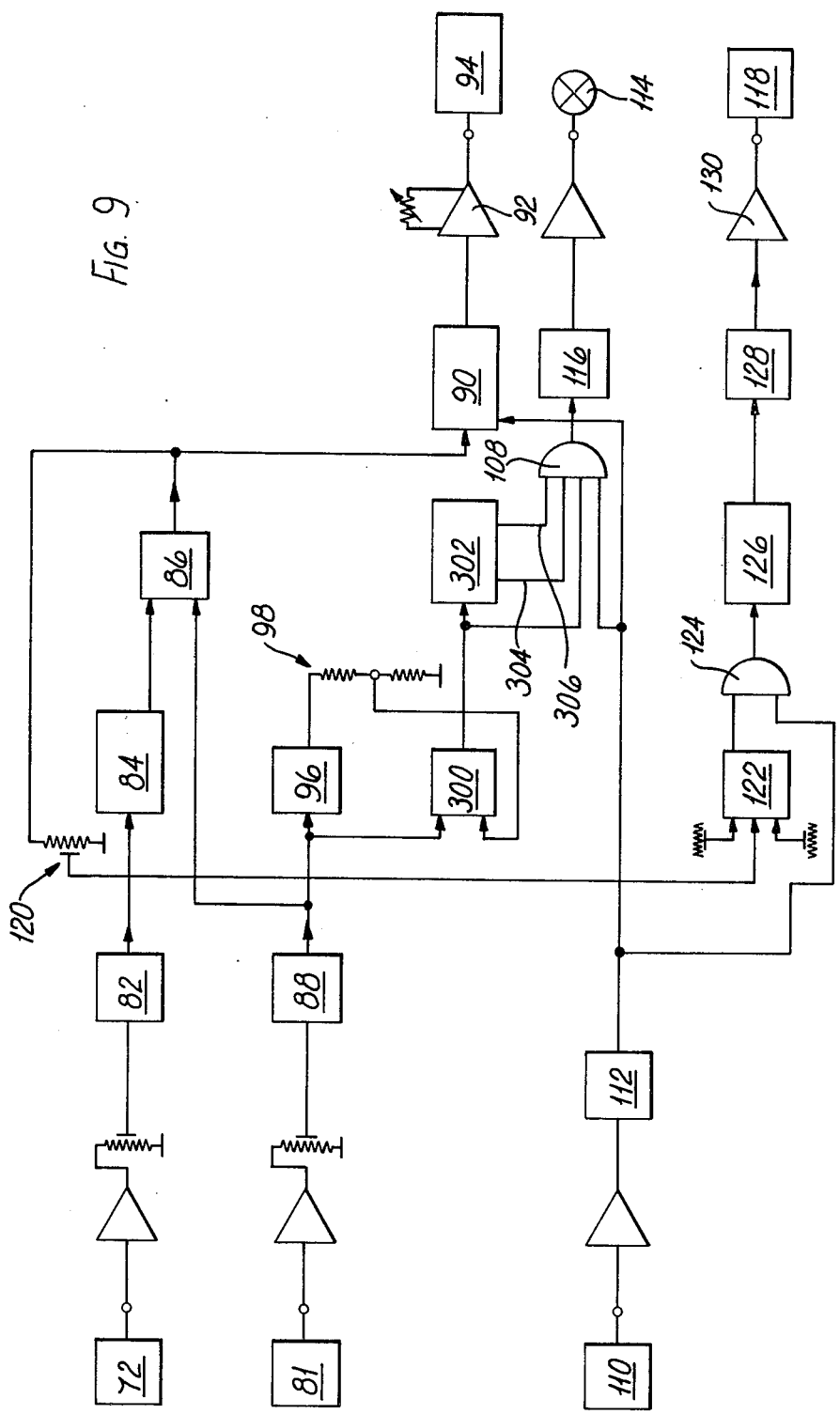
FIG. 9 is a single processing circuit for use with the testing drums of the present invention.

The signal processing circuit may be as shown in FIG. 9.

FIG. 6 also shows an additional valve pad 402 through which compressed air is delivered from a pipe 403 to blow each successive cigarette away from the seal after testing. This enables the cigarettes to be transferred easily from the testing drum without risk of damage to the seals or to the cigarettes themselves. As shown in FIG. 9, the signal from transducer 72 is amplified and passed through a gating system 82 which ensures that a reading is only admitted when a cigarette is present at the first test station. The signal is then passed to a delay module 84 which is arranged to delay its transmission by the time taken for two cigarettes to pass, before it is applied to the input of an analogue divider 86. This enables it to be delivered by the signal produced by the same cigarette at the second test station, as indicated by the transducer 81 (FIG. 6) which is two "flutes" downstream. The latter signal is also gated by a gate 88 before being applied to the other input of the divider 86. The quotient output of the analogue divider 86 corresponds to the dilution of the cigarette being tested and is applied to a digital integrator 90 whose output is fed via an amplifier 92 (whose gain can be varied for calibration purposes) to a dilution read-out device 94.

The gated signal from the gate 88 is also fed to an averaging device 96, whose output is applied to a potential divider 98 arranged to give an output of three-quarters of the average value. The signal arriving at the averaging device is compared with this 75% average value in a comparator 100, so that if any individual cigarette gives a reading of less than 75% of the average, the comparator will produce an output. This output could be indicative of the failure of one of the flexible seals, and in order to determine whether this is so, the output from the comparator 100 is fed to the input of a shift register device 102 which is arranged to produce outputs to lines 104 and 106 delayed by "n" and "2n" cigarette pulses, where "n" is the number of flutes on the test drum. If outputs occur on both lines 104 and 106 at the same time as an output from comparator 100, this is taken to be indicative of a bad seal, since it is unlikely that three successive faulty cigarettes would occur at intervals of exactly "n" cigarettes. These three signals are therefore fed to an AND-gate 108 which also receives an enabling pulse from an optical cigarette detector 110 (see also FIG. 6) so that a missing cigarette will not be interpreted as a fault. The output from the optical detector is passed to the AND-gate via a 3-cigarette delay device 112 since the detector is positioned three cigarettes ahead of the second test station 68 (FIG. 6), which provides the "bad-seal" check-signal; thus the enabling signal only occurs when a cigarette is actually in the test station 68. The output from the AND-gate 108 is fed to an alarm device 114 via a monostable 116 to provide a pulse of reasonable duration to activate the alarm.

The output from the analogue divider 86 is used to operate a pneumatic solenoid-controlled ejection device 118 if a cigarette is discovered to have a dilution rating which is unsatisfactory. This is achieved by feeding the dilution signal, via a sensitivity control 120, to a "window detector" 122 in which "high" and "low" dilution limits are set. The output from the detector is fed to an AND-gate 124 which is enabled by the optical detector 112 and from there passes to an adjustable delay device 126 which is set to a number of cigarette pulses which corresponds to the spacing between the test station 68 and the ejection device 118. The output of the delay device 126 is fed to the ejection device via an adjustable monostable 128 and an amplifier 130.

FIG. 7 shows diagrammatically an arrangement which is similar to FIG. 1 but differs principally in regard to the means for pushing the cigarette against the seal in preparation for testing.

As in FIG. 1, the test drum 210 has a flange 211 carrying seals 212 which have conical end portions 213. A cigarette 199 is supported at the tobacco end by a flange 214 which extends outwards along the sides of the cigarette to the periphery of the drum. Similar flanges 215 and 216 support the other end of the cigarette and are spaced apart to define an annular space which is vented to atmosphere, during testing, via a slot 217 in the cowl 218.

It should be noted that the conical portion 216 of the seal lies within a slightly larger conical recess in the flange 211 and is therefore protected against inadvertent damage.

In this example each of the pushers 219 comprises a hollow bellows member having a narrow end portion 220 which is secured in an aperture in a flange 221 on the drum. Two arrangements are possible. In order to push the cigarette against the seal 212, the bellows 219 may be extended by compressed air supplied to it by a valve pad 222; in that case, the unstressed state of bellows would be shorter than is shown in FIG. 7. Alternatively, the unstressed state of the bellows may be relatively long, and the bellows may be retracted by suction pressure supplied through the valve pad 222 prior to the arrival of the cigarette in the corresponding flute, after which suction is released to allow the bellows to expand and push the cigarette against the seal; suction is again applied to release the cigarette prior to its transfer from the drum 210.

FIG. 7 shows a wide suction cowl of which the end wall 223 cooperates with the flange 221 on the drum to define a suction chamber extending over the tobacco end of the cigarette. As explained with reference to FIGS. 1 to 3, this may be the arrangement existing at a second test station; at a first test station, the position of the wall 223 may be as shown by the chain dotted line 224. There may also be a third test station at which the cowl is still narrower, terminating at a wall 225; this would enable the testing device to make a direct measurement of the amount of air passing through the cigarette wrapper via or in the vicinity of perforations 226.

A testing device according to this invention may be arranged to provide only this last test. Alternatively, it may provide for all three tests or for any combination of the three tests. Various characteristics of the cigarette may be indicated by the signal processing circuit; for example, the difference between the signals at the first and third test stations (using respectively cowl walls 224 and 225) may be taken as an indication of the air permeability of the cigarette paper between those two walls.

In FIG. 7 the clearance between the cigarette and the drum 210 and cowl 218 is shown somewhat exaggerated for the purpose of illustration.

FIG. 8 shows another different form of pusher. A flexible bellows member 227 is connected to one end of a pin 228 which is suspended by flexible diaphragms 229 and 230 secured to a sleeve 231. The sleeve is in turn secured in a flange 232 at one end of a testing drum 233. An inclined plate 234 rotates with the drum 233 and engages and displaces the pin 228 so that the bellows member 227 pushes the cigarette 235 against the seal (not shown) at the other end of the cigarette and holds the cigarette in that position during testing. The bellows member 227 acts as a light compression spring. In practice the diaphragms 229 and 230 may be somewhat larger in diameter than is shown in FIG. 8.

We claim:

1. A device for testing filter cigarettes, comprising a drum or equivalent means for conveying cigarettes in succession through a test station at which each cigarette in turn is tested with the aid of a pressure chamber surrounding the wrapper of the cigarette, and a pressure detector connected to the filter end of the cigarette while the tobacco end of the cigarette is open to atmosphere, and including means for measuring the pressure in the pressure chamber and means for comparing that pressure with the pressure detected at the filter end of the cigarette.

2. A device according to claim 1 in which the pressure detector connected to the end of the cigarette at the test station is arranged to produce a first electrical signal, and in which a second electrical signal is produced responsive to the pressure in the chamber, both of these signals being fed to an electrical device which produces an output indicative of the relationship of the two signals.

3. A device according to claim 2 in which the electrical device is a signal divider which produces an output representing the ratio of the two signals.

4. A device according to claim 1, 2 or 3 in which there is a second test station at which the pressure chamber is arranged to extend over the tobacco end of the cigarette, and at which an indication of the chamber pressure is given by a pressure detector connected to the filter end of the cigarette.

5. A device according to claim 4 in which a second pressure detector is connected to the filter end of the cigarettes at the second test station.

6. A device according to claim 5 having a signal processing circuit including a delay element which delays the first-generated pressure signal so that signals for the same cigarette are compared.

7. A device according to claim 4 in which the pressure chamber around each cigarette at the or each testing station is defined partly by a flute in the drum containing the cigarette, and partly by a fixed cowl which lies close to the periphery of the drum and communicates with a pressure source, the width of the cowl being different at the two test stations so as to define pressure chambers of approximately different length.

8. A device according to claim 7 in which the cowl has a flange which lies close to the periphery of the drum and is formed with a slot for venting to atmosphere an annular groove in the flute containing the cigarette at the or each testing station, which groove extends around the cigarette near the filter end to prevent any direct communication between the pressure chamber and the pressure detector.

9. A device according to claim 1 for testing ventilated cigarettes, in which the pressure chamber extends to near the filter end of the cigarette at the or each test station.

10. A device according to claim 1 in which the or each pressure detector connected to the filter end of the cigarette is connected via a flexible seal which resiliently engages the cigarette.

11. A device according to claim 10 in which the seal has a conical end in which the cigarette is arranged to engage.

12. A device according to claim 10 in which a pusher member is arranged to engage the tobacco end of each cigarette, as it approaches the test station or stations, to move the cigarette axially towards the corresponding seal.

13. A device according to claim 10 including a number of pusher members which are carried by a part which is mounted on or moves with the drum carrying the cigarettes, each pusher member being aligned with a respective cigarette at least in the region of the test station or stations.

14. A device according to claim 13 in which each pusher member is arranged to remain in contact with the respective cigarette so as to hold the cigarette against the seal while it is passing through the test station or stations.

15. A device according to claim 12, 13 or 14 in which the pusher members are carried or moved by a ring member which is arranged to rotate about an axis inclined to the axis of rotation of the drum carrying the cigarettes.

16. A device according to claim 12, 13 or 14 in which each pusher member comprises a bellows which is arranged to be expanded or contracted by the application of compressed air or suction.

17. A device according to claim 1 in which the drum is arranged to convey and test cigarettes delivered to it in two rows, the drum having a central flange carrying seals on opposite sides for engagement with the filters of the cigarettes of the respective rows.

18. A device according to claim 17 in which there is a common pressure detector at the testing station which is arranged to communicate alternately with cigarettes from the two rows.

19. A device according to claim 18 in which flutes in the drum are arranged to receive the cigarettes of the respective rows are staggered with respect to each other.

20. A device for testing filter cigarettes, comprising conveyor means for conveying cigarettes in succession along a predetermined path; a pressure source; sealing means connected to the filter end of each cigarette; means defining a first test station along the said path, comprising a first pressure detector connected to the sealing means, and means communicating with said pressure source and defining a pressure chamber around the wrapper of the cigarette, the tobacco end of the cigarette being open to atmosphere, means defining a second test station along the said path, comprising a second pressure detector connected to the sealing means, and means communicating with said pressure source and defining a pressure chamber extending around the wrapper of the cigarette and over the tobacco end of the cigarette; and means for comparing the outputs of the two pressure detectors with respect to each cigarette.

21. A device for testing filter cigarettes, comprising a drum or equivalent means for conveying cigarettes in succession through a test station at which each cigarette in turn is tested, with the aid of an end seal engaging one end of the cigarette at the test station, the cigarette being pressed against the end seal by a pusher member engaging the other end of the cigarette and comprising a bellows arranged to receive compressed air or suction whereby the bellows is expanded or contracted, each pusher member being arranged to be in a contracted state (either naturally or owing to the action of internal suction) when the corresponding cigarette is transferred to or from the drum.

22. A device for testing filter cigarettes, comprising a drum or equivalent means for conveying cigarettes in succession through a test station at which each cigarette in turn is tested with the aid of a pressure detector connected to one end of each cigarette in turn at the test station, characterised in that the pressure detector is a semiconductor device mounted on a fixed valve pad which lies against a surface of the drum and communicates with successive passages in the drum leading to end seals connected to the respective cigarettes.

23. An article testing device including a conveyor having "n" article-carriers, so that the same carrier passes through a given test station at intervals of "n" articles; means for forming an average of all the test signals from the test station; means for comparing each test signal with the average and for producing an output if the result of the comparison is unsatisfactory; a signal-delaying device for producing one or more further outputs from the comparator output, which are each delayed by the interval "n" or an integral multiple of the interval "n"; and means for comparing the delayed signal or signals with the comparator output and for producing an alarm output if the outputs from the comparator and the delay device coincide.

* * * * *